March 25, 1924.
V. DE YBARRONDO
1,487,729
APPARATUS FOR DEVELOPING MOTION PICTURE FILMS
Filed July 31, 1920    2 Sheets-Sheet 1
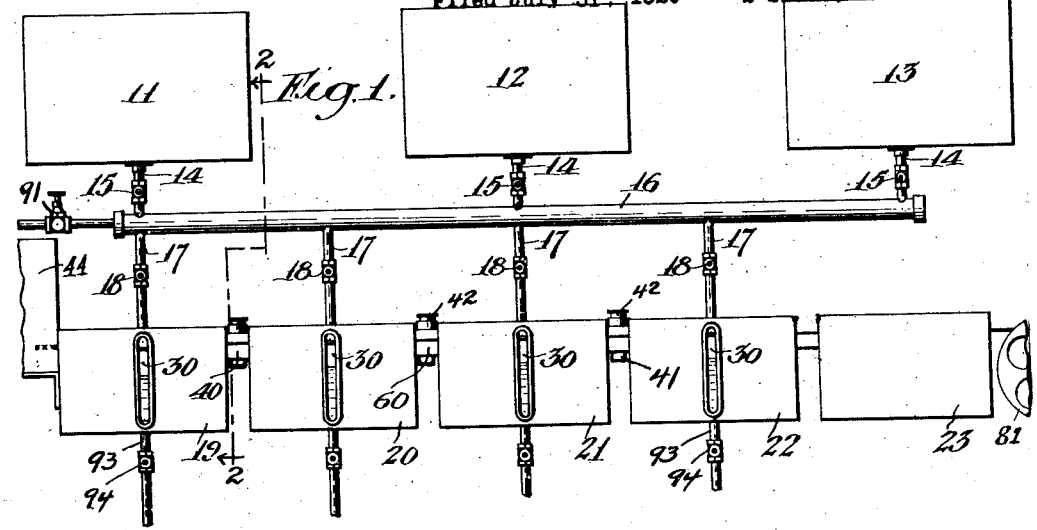
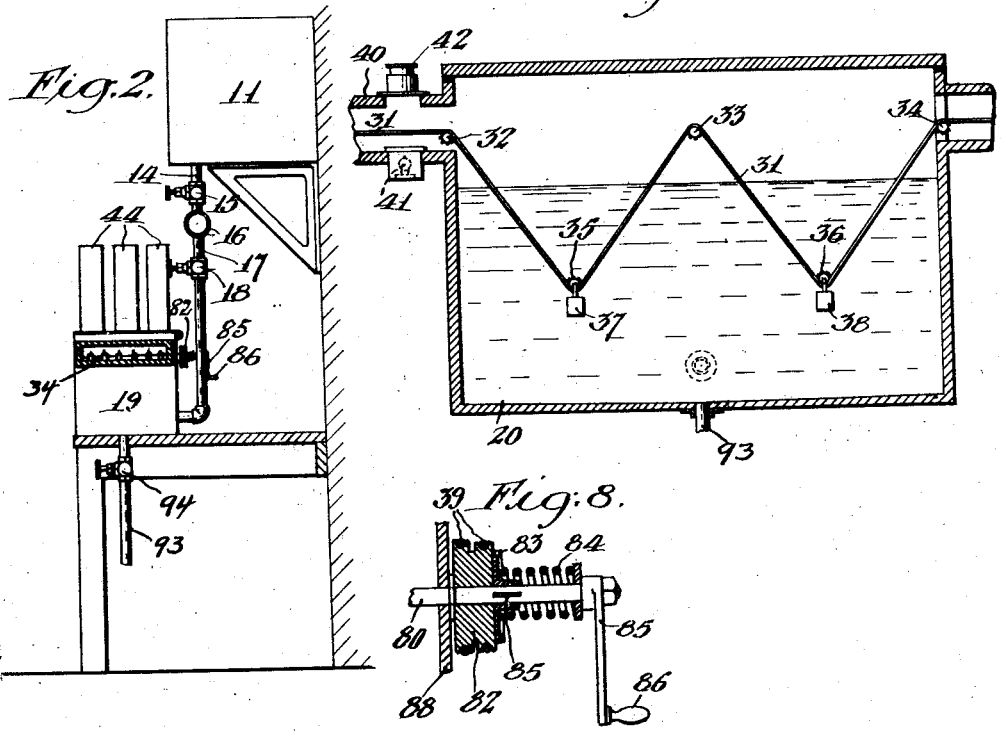
Inventor
Vincent de Ybarrondo
by Graham & Lewis
Attorneys March 25, 1924.
V. DE YBARRONDO
1,487,729
APPARATUS FOR DEVELOPING MOTION PICTURE FILMS
Filed July 31, 1920   2 Sheets-Sheet 2
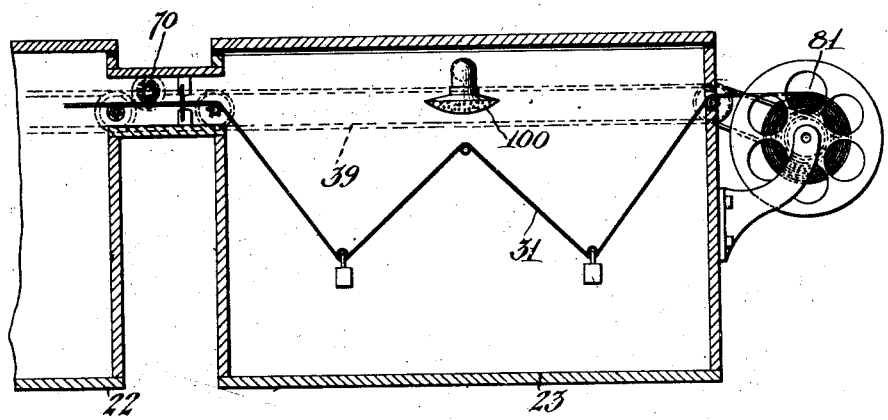
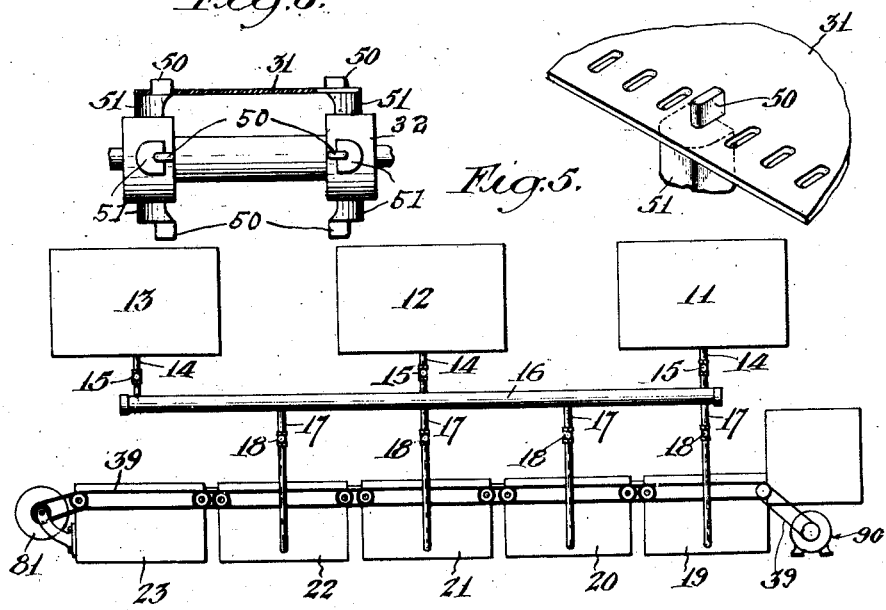
Inventor
Vincent de Ybarrondo
by Graham & Ourri
Attorneys.

Patented Mar. 25, 1924.

1,487,729

UNITED STATES PATENT OFFICE.

VINCENT DE YBARRONDO, OF LOS ANGELES, CALIFORNIA.

APPARATUS FOR DEVELOPING MOTION-PICTURE FILMS.

Application filed July 31, 1920. Serial No. 400,468.

*To all whom it may concern:*

Be it known that I, VINCENT DE YBARRONDO, a citizen of the United States, residing at Los Angeles, county of Los Angeles, and State of California, have invented a new and useful Apparatus for Developing Motion-Picture Films, of which the following is a specification.

My invention relates to the art of producing motion pictures and an object of the invention is to provide an apparatus for developing, washing, fixing and drying these films.

The invention resides in the novel combination and arrangement of parts hereinafter described or shown in the drawings.

Further objects and advantages will be made evident hereinafter.

Referring to the drawings which are for illustrative purposes only,

Fig. 1 is a front elevation of a preferred form of my invention.

Fig. 2 is a section taken as indicated by the line 2—2 of Fig. 1.

Fig. 3 is a view through the center of one of the developing boxes.

Fig. 4 is a section through a dryer box.

Fig. 5 is a rear view showing the means for driving the various sprockets.

Fig. 6 is a view of a sprocket with the film in place thereon.

Fig. 7 is a perspective view of a sprocket tooth in place in a film.

Fig. 8 is a view of an adjusting crank.

In the form of my invention shown in these drawings, I provide a plurality of solution tanks 11, 12 and 13, three only being shown but any multiple of this number being provided as desired. These tanks are each connected through a pipe 14 controlled by a valve 15 with a manifold 16 which is connected through pipes 17 controlled by valves 18 with a plurality of developing boxes 19, 20, 21 and 22. A pipe 90, having a valve 91 therein, connects into the manifold 16 for the purpose of introducing washout water as desired, and drains 93 are provided through which the contents of the developing boxes may be drained off by opening valves 94.

Altho I have shown five boxes, I may in practice use more than this number and in fact in the standard development of the film, I would in most cases prefer to use more than this number. The boxes, 19, 20, 21 and 22 may be used for containing, developing, washing or fixing solutions, the box 23 being used as a dryer. The boxes 19, 20, 21 and 22 are each provided with an opening 30 closed by a ruby glass member through which the solution may be viewed. The film to be developed, shown at 31, enters the box 19 from a reel, not shown, and passes over sprockets 32, 33 and 34 being held in loops by sprockets 35 and 36 which hang upon the film which is maintained tight by means of weights 37 and 38. The sprockets 32, 33 and 34 are connected together and are also connected with the sprockets in the other boxes 20, 21, 22 and 23 by means of belts 39 shown in Fig. 5, the whole system of sprockets either being turned by hand or through a suitable motor. The film passes from the first box 19 through a tube 40 over a ruby light 41 and by a lens system 42 which has a ruby eye piece through which the film 31 may be viewed. The film can thus be inspected without exposing same.

In practice I use a plurality of film holders 44 and develop two or more films simultaneously, there being a plurality of sprockets 32 all mounted on the same shaft and a similar plurality of sprockets 33, 34, 35 and 36. These sprockets are constructed as shown in Fig. 6, the teeth 50 being off set as shown so that a film may pass over the sprocket with the emulsion side down without contacting with the support 51 of the sprocket. The purpose of the sight box formed by the tube 40, the lamp 41 and the lens system 42 is to enable the operator to examine the film after it passes through the first developing tank 19 and to strengthen or weaken the developer in the second tank to suit the amount of development in the first tank 19, a second sight box 60 being provided after it leaves the second tank 20 so that the operator can judge the result of the two developments. A sufficient number of developing tanks are provided to allow for a perfect control of the system, the film then being washed, fixed and washed again before being passed into the box 23 which forms the dryer. Before passing into this box, the film passes under a wheel 70 which tends to remove any surplus moisture therefrom, the film then passing through the dryer 23 which is provided with means 100 for delivering a current of dry air to the interior thereof, the finished film being wound upon a number of reels 81.

Each of the sprockets 32 and 34 is secured solidly on a shaft 80 shown in Fig. 8 which passes through the side 88 of its box. A double pulley 82 turns freely on the shaft 80 receiving a driving belt 39 and driving a second belt 39. A friction plate 83 is splined on the shaft 80 being free to slide axially thereon under the influence of a spring 84 which surrounds the shaft 80 but being prevented from turning therein by a key 85. A crank and handle 86 is rigidly fastened to the outer end of the shaft 80. Normally the shaft 80 is driven from the pulley 82 through the friction plate 83. The length of time the film remains in any tank depends upon the speed of the film and the length of the loop or loops in that tank. The film is driven by a motor 90 through the belts 39, this motor operating at a constant speed so that the film moves at a constant speed.

If now the operator who is watching the development of the film through the lens system 42 decides that it needs a longer or shorter time in any tank, he lengthens or shortens the loops in that tank by turning one or more of the handles 86. For example, if he wishes to lengthen the time in the box 19, he feeds more film into that box by turning the handle connected with the sprocket 32 of that box. If he wishes to shorten the time he holds that sprocket or turns it back or he can wind film out of the tank by turning the sprocket 34. In any case the plates 83 slip allowing the operator to adjust the film in any box while the remainder of the film is fed at its predetermined speed. The operator can thus watch the film during its development and varying this development at will.

I claim as my invention:

1. An apparatus for developing photographic film comprising a box for containing a developing solution, a sprocket in each end of said box over which said film passes, means adapted to ride on the loops of film between said sprockets for holding said film below the surface of said solution, means for driving said sprockets at a constant speed, and means by which either sprocket may be turned by hand at a faster or slower speed without interfering in any way with the other sprocket.

2. An apparatus for developing photographic film comprising a box for containing a developing solution, a sprocket in each end of said box over which said film passes, means by which an operator can view said film without exposing same as it leaves said box, means adapted to ride on the loops of film between said sprockets for holding said film below the surface of said solution, means for driving said sprockets at a constant speed, and means by which either sprocket may be turned by hand at a faster or slower speed without interfering in any way with the other sprocket.

3. An apparatus for developing photographic film comprising a series of boxes for containing the chemical solutions necessary to effect development, means by which the film may be caused to form a series of loops through said boxes, means for driving said film at a constant speed, and means by which an operator can change the length of any loop while the film is in motion.

4. An apparatus for developing photographic film comprising a series of boxes for containing the chemical solutions necessary to effect development, means by which the film may be caused to form a series of loops through said boxes, means by which an operator can view said film at different points during development without exposing the film, means for driving said film at a constant speed, and means by which an operator can change the length of any loop while the film is in motion.

5. In a motion picture developing apparatus a sprocket over which the film is looped, a shaft on which said sprocket is secured, a pulley turning freely on said shaft, a belt for driving said pulley at a constant speed, means for manually turning said shaft, and a spring operated friction clutch by which said pulley frictionally drives said shaft.

In testimony whereof, I have hereunto set my hand at Los Angeles, California, this 24th day of July 1920.

VINCENT DE YBARRONDO.